(12) United States Patent
Xu

(10) Patent No.: US 11,953,661 B2
(45) Date of Patent: Apr. 9, 2024

(54) ZOOM LENS, ZOOM METHOD AND TERMINAL

(71) Applicant: GUANGDONG OPPO MOBILE TELECOMMUNICATIONS CORP., LTD., Guangdong (CN)

(72) Inventor: Qing Xu, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 350 days.

(21) Appl. No.: 17/557,017

(22) Filed: Dec. 20, 2021

(65) Prior Publication Data

US 2022/0113519 A1    Apr. 14, 2022

Related U.S. Application Data

(63) Continuation of application No. PCT/CN2020/096612, filed on Jun. 17, 2020.

(30) Foreign Application Priority Data

Jun. 24, 2019    (CN) .......................... 201910551127.5

(51) Int. Cl.
*G02B 15/04* (2006.01)
*G03B 17/17* (2021.01)
(Continued)

(52) U.S. Cl.
CPC ............. *G02B 15/04* (2013.01); *G03B 17/17* (2013.01); *G03B 30/00* (2021.01); *H04N 23/69* (2023.01)

(58) Field of Classification Search
CPC ........ G02B 15/04; G03B 30/00; G03B 17/17; H04N 23/69
(Continued)

(56) References Cited

U.S. PATENT DOCUMENTS

| 4,114,171 A | 9/1978 | Altman |
| 2004/0105025 A1 | 6/2004 | Scherling |

(Continued)

FOREIGN PATENT DOCUMENTS

| CN | 1837880 | 9/2006 |
| CN | 101021611 | 8/2007 |

(Continued)

OTHER PUBLICATIONS

EPO, Extended European Search Report for EP Application No. 20833017.5, dated Jul. 13, 2022.
(Continued)

*Primary Examiner* — William Choi
(74) *Attorney, Agent, or Firm* — Hodgson Russ LLP

(57) ABSTRACT

Disclosed are a zoom lens, a zoom method and a terminal. The zoom lens includes n lens groups, n reflecting elements and n imaging planes, where n is an integer greater than or equal to 2. The n lens groups and an n-th imaging plane are arranged sequentially along an optical axis. A first reflecting element is configured to receive and reflect first incident light to a first lens group. An i-th imaging plane is arranged between an i-th lens group and an (i+1)-th lens group, where i is an integer greater than or equal to 1 and less than n. A j-th reflecting element is disposed between a (j−1)-th lens group and a j-th lens group, and is configured to be moved and/or rotated to enable the zoom lens to zoom, where j is an integer greater than 1 and less than or equal to n.

20 Claims, 6 Drawing Sheets

(51) Int. Cl.
*G03B 30/00* (2021.01)
*H04N 23/69* (2023.01)

(58) Field of Classification Search
USPC .................................................. 359/676, 694
See application file for complete search history.

(56) References Cited

U.S. PATENT DOCUMENTS

| 2006/0017834 A1 | 1/2006 | Konno et al. |
| 2006/0216018 A1 | 9/2006 | Chang |
| 2010/0066894 A1 | 3/2010 | Seo |
| 2010/0097707 A1 | 4/2010 | Seo |

FOREIGN PATENT DOCUMENTS

| CN | 101165586 | 4/2008 |
| CN | 101196611 | 6/2008 |
| CN | 100516962 | 7/2009 |
| CN | 205507203 | 8/2016 |
| JP | 2006081089 | 3/2006 |
| JP | 2006173975 | 6/2006 |

OTHER PUBLICATIONS

CNIPA, First Office Action for CN Application No. 201910551127.5, dated May 7, 2021.
WIPO, International Search Report for PCT/CN2020/096612, dated Sep. 7, 2020.
CNIPA, Notification to Grant Patent Right for Invention for CN Application No. 201910551127.5, dated Sep. 13, 2021.

ZOOM LENS, ZOOM METHOD AND TERMINAL

CROSS-REFERENCE TO RELATED APPLICATIONS

This application is a continuation of International Application No. PCT/CN2020/096612, filed Jun. 17, 2020, which claims priority to Chinese Patent Application No. 201910551127.5, filed Jun. 24, 2019, the entire disclosures of which are incorporated herein by reference.

TECHNICAL FIELD

The present disclosure relates to the field of optical zoom technologies, and particularly to a zoom lens, a zoom method and a terminal.

BACKGROUND

A zoom lens refers to a lens whose focal length can be changed within a certain range, so as to offer different fields of view, and thus enable images of different sizes and different scene ranges to be obtained. In other words, the zoom lens can make the shooting range changed by changing the focal length, without changing the shooting distance. Therefore, one zoom lens can serve as several fixed focal lenses, which is conducive to the picture composition.

At present, in the case where zooming (i.e., changing the focal length) is achieved by means of the optical structure of a multi-segment lens, the number of available focal lengths is small, which imposes limitations on the zoom lens.

SUMMARY

In a first aspect, a zoom lens is provided in the embodiments of the present disclosure. The zoom lens includes n lens groups, n reflecting elements and n imaging planes, where n is an integer greater than or equal to 2. The n lens groups and an n-th imaging plane of the n imaging planes are arranged sequentially along an optical axis. A first reflecting element of the n reflecting elements is configured to receive first incident light of an object side, and reflect the first incident light to a first lens group of the n lens groups. An i-th imaging plane of the n imaging planes is disposed, in parallel to the optical axis, between an i-th lens group and an (i+1)-th lens group of the n lens groups, where i is an integer greater than or equal to 1 and less than n. A j-th reflecting element of the n reflecting elements is disposed between a (j−1)-th lens group and a j-th lens group of the n lens groups, and is configured to be moved and/or rotated to enable the zoom lens to zoom, where j is an integer greater than 1 and less than or equal to n.

In a second aspect, a zoom method is provided in the embodiments of the present disclosure. In the method, a zoom instruction is received, and the zoom lens is controlled to zoom according to the zoom instruction to obtain at least one focal length.

In a third aspect, a terminal is provided in the embodiments of the present disclosure. The terminal includes the zoom lens. The zoom lens includes n lens groups, n reflecting elements, and n imaging planes, where n is an integer greater than or equal to 2. The n lens groups and a n-th imaging plane of the n imaging planes are arranged sequentially along an optical axis. A first reflecting element of the n reflecting elements is configured to receive the first incident light of the object side, and reflect the first incident light to a first lens group of the n lens groups. An i-th imaging plane of the n imaging planes is disposed, in parallel to the optical axis, between an i-th lens group and an (i+1)-th lens group of the n lens groups, where i is an integer greater than or equal to 1 and less than n. A j-th reflecting element of the n reflecting elements is disposed between a (j−1)-th lens group and a j-th lens group of the n lens groups, and is configured to be moved and/or rotated to enable the zoom lens to zoom, where j is an integer greater than 1 and less than or equal to n.

In a fourth aspect, a computer-readable storage medium is provided in the embodiments of the present disclosure. The computer-readable storage medium stores programs thereon and is applied to the zoom lens. When being executed by a processor, the programs cause the zoom method as mentioned above to be implemented.

DETAILED DESCRIPTION OF PREFERRED EMBODIMENTS

Figure 1:
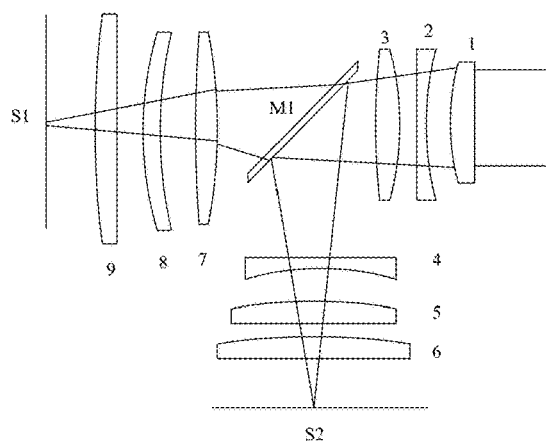
FIG. 1 is a schematic diagram illustrating imaging through beam splitting of a three-segment zoom lens.

The technical solutions of the present disclosure will be described below clearly and completely with reference to the drawings of the embodiments of the present disclosure. It can be understood that, the specific embodiments described here are merely used to explain the disclosure, rather than limiting the present disclosure. It also should be noted that only the parts related to the disclosure are shown in the drawings for the convenience of description.

FIG. 1 is a schematic diagram illustrating imaging through beam splitting of a three-segment zoom lens. As shown in FIG. 1, in the three-segment zoom lens, optical lenses are indicated by numbers 1-9, imaging planes are indicated by S1 and S2, a beam-splitting mirror is indicated by M1 which enables equipartition of beam or polarization beam splitting. The lenses 1-3 form a common lens group. After a beam passes through the lens group, one part of the beam is transmitted through the beam-splitting mirror M1 to the lenses 7-9, and is imaged on the imaging plane S1, and another part of the beam is reflected by the beam-splitting mirror M1 to the lenses 4-6, and is imaged on the imaging plane S2. It can be seen that only two different focal lengths are available in the three-segment zoom lens shown in FIG. 1. In addition, when imaging is implemented in multiple optical paths by means of beam splitting, the luminous flux in each optical path is relatively small, which result in a dark image. Furthermore, for the three-segment zoom lens shown in FIG. 1, the lens sizes in three directions have to be similar to each other, and it is impossible to make the lens size in one direction small; therefore, the whole size of the three-segment zoom lens is large.

The embodiments of the present disclosure propose a zoom lens. By inserting reflecting elements or moving away the reflecting elements in the multi-segment zoom lens, the multi-segment zoom lens can be freely switched between segmented imaging and combined imaging. In this way, more different focal lengths of the zoom lens are available, that is, the number of the available focal lengths of the zoom lens is greatly increased, and the limitations on the zoom lens are broken through.

The technical solutions in the embodiments of the present disclosure will be described below clearly and comprehensively with reference to the drawings of the embodiments of the present disclosure.

Figure 2:
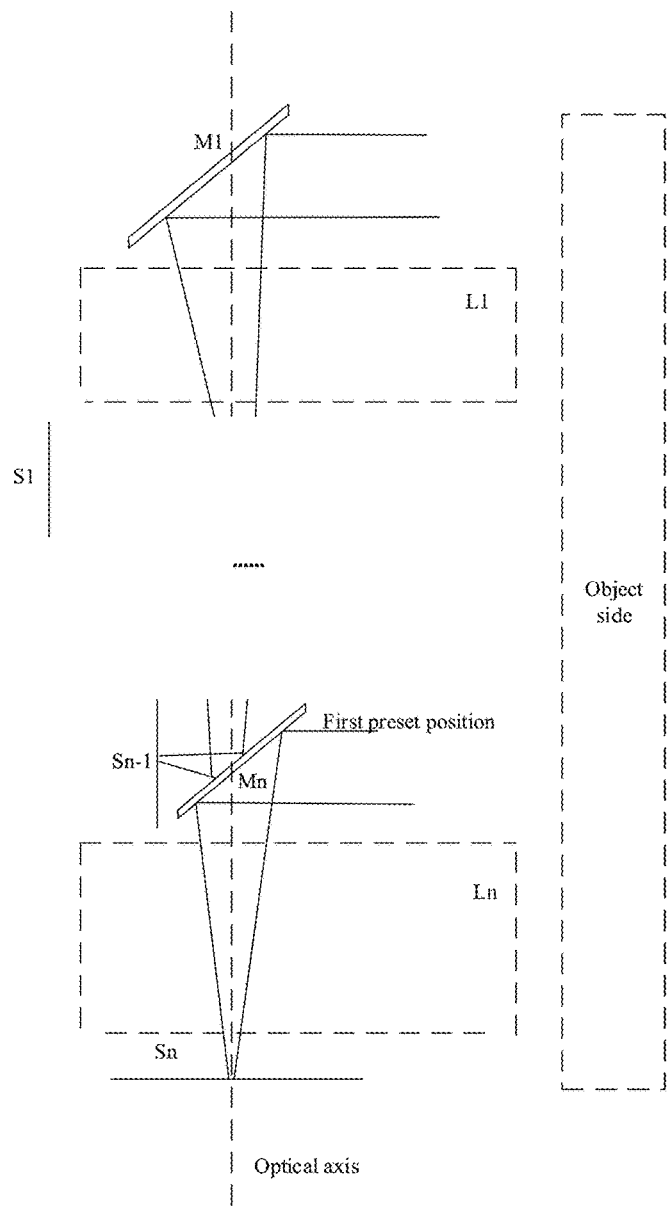
FIG. 2 is a first schematic structural diagram of a zoom lens provided in the embodiments of the present disclosure.

The embodiments of the present disclosure provide a zoom lens. FIG. 2 is a first schematic structural diagram of the zoom lens provided in the embodiments of the present disclosure. As shown in FIG. 2, in the embodiments of the present disclosure, the zoom lens may include n lens groups L1 . . . Ln, n reflecting elements M1 . . . Mn, and n imaging planes S1 . . . Sn, where n is an integer greater than or equal to 2.

Further, in the embodiments of the present disclosure, any one of the n lens groups L1 . . . Ln may be composed of at least one optical lens. That is, any one of then lens groups L1 . . . Ln may include at least one lens. The lens included in the zoom lens is an optical element made of a transparent material and having at least a spherical surface, and it may be a convex lens, a concave lens, a biconvex lens, a plano-convex lens, a meniscus lens or other types.

It should be noted that, in the embodiments of the present disclosure, any one of the n reflecting elements M1 . . . Mn may be a reflecting mirror or a liquid crystal reflector, which is not limited here.

Further, in the embodiments of the present disclosure, any one of the n imaging planes S1 . . . Sn is a light receiving plane configured with a solid-state imaging element, such as a charge-coupled device (CCD) or a complementary metal oxide semiconductor (CMOS).

It should be noted that, in the embodiments of the present disclosure, the n lens groups L1 . . . Ln and an n-th imaging plane Sn of the n imaging planes may be sequentially arranged along an optical axis of the zoom lens. In other words, in the direction of the optical axis, the lens groups L1 . . . Ln and the n-th imaging plane Sn are arranged in order. The n-th imaging plane Sn is substantially perpendicular to the optical axis.

Further, in the embodiments of the present disclosure, the optical axis refers to a centerline of a light beam (light pillar), or a symmetry axis of the optical system. The light beam does not have any changes in optical characteristics when rotating around the optical axis. A straight line passing through centers of two spherical surfaces of the lenses is referred as a main optical axis. Specifically, the optical axis of a lens having a single spherical surface is a straight line passing through the center of the spherical surface and being perpendicular to the mirror surface of the lens. The optical axis of the lens groups or a coaxial optical system is a line connecting centers of the spherical surfaces of the lenses. It should be noted that any straight line passing through an optical center of a lens can be referred as the optical axis of the lens, which is generally referred as a secondary optical axis.

It should be noted that, in the embodiments of the present disclosure, the optical axis may be a line connecting the centers of the spherical surfaces of all the lenses of the n lens groups L1 . . . Ln.

Further, in the embodiments of the present disclosure, based on FIG. 2, an object side may be located on a right side of the n reflecting elements, and located on one side of the optical axis. The first reflecting element M1 of the n reflecting elements may be fixed on the optical axis at a preset angle, and it may receive first incident light from the object side and reflect the first incident light to the first lens group L1 of the n lens groups. In other words, in the embodiments of the present disclosure, the first incident light from the object side may be reflected by the first reflecting element M1 to the first lens group L1, and pass through other lens groups of the n lens groups along the optical axis, so as to be imaged on the n imaging planes S1 . . . Sn.

It should be noted that, in the embodiments of the present disclosure, an i-th imaging plane S1 of the n imaging planes S1 . . . Sn may be disposed between an i-th lens group and an (i+1)-th lens group of the n lens groups and be in parallel to the optical axis, where i is an integer greater than or equal to 1 and less than n. The first imaging plane S1 to the (n−1)-th imaging plane of the n imaging planes S1 . . . Sn are located at a side of the optical axis that is opposite from the object side.

Further, in the embodiments of the present disclosure, a j-th reflecting element Mj of the n reflecting elements is disposed between a (j−1)-th lens group and a j-th lens group of the n lens groups, and is configured to be moved and/or rotated to enable the zoom lens to zoom, where j is an integer greater than 1 and less than or equal to n.

It should be noted that, in the embodiments of the present disclosure, the zoom lens may further include a control device. The control device is configured to control the j-th reflecting element Mj to move and/or rotate to a first preset position or a second preset position.

Further, in the embodiments of the present disclosure, the first preset position may be a position where the respective reflecting element takes the optical axis as the center. Specifically, when the j-th reflecting element Mj is in the first preset position, it may be provided on the optical axis at the preset angle, i.e., this reflecting element may intersect the optical axis with the preset angle defined therebetween.

Further, in the embodiments of the present disclosure, the second preset position may be a position where the respective reflecting element is parallel to the optical axis. Specifically, when the j-th reflecting element Mj is in the second preset position, it may be disposed, in parallel to the optical axis, between the (j−1)-th lens group and the j-th lens group of the n lens groups L1 . . . Ln. When the j-th reflecting element Mj is in the second preset position, the j-th reflecting element Mj and the (j−1)-th imaging plane are symmetrical with respect to the optical axis, and the j-th reflecting element Mj is located on a same side of the optical axis as the object side.

It should be noted that, in the embodiments of the present disclosure, when the j-th reflecting element Mj is moved and/or rotated to the first preset position, the j-th reflecting element Mj may reflect the light refracted by the (j−1)-th lens group to the (j−1) imaging plane, so that an image corresponding to the (j−1)-th imaging plane can be obtained on the (j−1)-th imaging plane.

Further, in the embodiments of the present disclosure, when the j-th reflecting element Mj is moved and/or rotated to the first preset position, the j-th reflecting element Mj reflects, at one side thereof away from the object side, the light refracted by the (j−1)-th lens group to the (j−1)-th imaging plane, and at the same time, the j-th reflecting element Mj may also receive, at an opposite side thereof facing the object side, a j-th incident light from the object side and reflect the j-th incident light to the j-th lens group of the n lens groups L1 . . . Ln. For example, based on FIG. 2, the object side is located on the right side of the n reflecting elements, and when the j-th reflecting element Mj is in the first preset position, it can receive the j-th incident light from the object side and reflect the j-th incident light to the j-th lens group Lj of the n lens groups. In other words, in the embodiments of the present disclosure, the j-th incident light from the object side may be reflected by the j-th reflecting element Mj to the j-th lens group Lj, and may pass through other lens groups along the optical axis, so as to be imaged on the imaging planes Sj . . . Sn.

It should be noted that, in the embodiments of the present disclosure, the first incident light and the j-th incident light are incident light from the same object side. The first incident light is light from the object side that is received by M1, and the j-th incident light is light from the object side that is received by Mj.

Further, in the embodiments of the present disclosure, when other reflecting elements of the n reflecting elements excepting the first reflecting element are all moved and/or rotated to the first preset position, each of the n lens groups performs the imaging independently based on the corresponding incident light from the object side that is reflected by the respective reflecting element, to obtain n images on the n imaging planes, where each imaging plane corresponds to one respective image. For example, in a case where n=4, the second reflecting element, the third reflecting element and the fourth reflecting element are all moved and/or rotated to the first preset position, that is, each of the second reflecting element, the third reflecting element and the fourth reflecting element is disposed on the optical axis at the preset angle, accordingly, the second reflecting element reflects the light refracted by the first lens group to the first imaging plane to obtain a respective image, and at the same time, the second reflecting element can also receive the incident light from the object side and reflect the received incident light to the second lens group; and so on, the zoom lens can obtain four images on the four imaging planes respectively.

Further, in the embodiments of the present disclosure, when other reflecting elements of the n reflecting elements excepting the first reflecting element are all moved and/or rotated to the second preset position, all the lens groups are combined to perform the imaging based on the first incident light, to obtain an image corresponding to the first incident light on the n-th imaging plane. For example, in a case where n=2, the second reflecting element is moved and/or rotated to the second preset position, that is, the second reflecting element is disposed, in parallel to the optical axis, between the first lens group and the second lens group, accordingly, the light refracted by the first lens group reaches the second lens group, and an image is obtained on the second imaging plane. That is, in this case, the zoom lens may obtain an image through the combination of the first lens group and the second lens group.

Further, in the embodiments of the present disclosure, when the j-th reflecting element of the n reflecting elements is moved and/or rotated to the first preset position, and other reflecting elements of the n reflecting elements, excepting the first reflecting element and the j-th reflecting element, are moved and/or rotated to the second preset position, the first lens group to the (j−1)-th lens group of the n lens groups that are arranged along the optical axis perform the imaging based on the first incident light, to obtain the image corresponding to the first incident light; in addition, the j-th lens group to the n-th lens group of the n lens groups that are arranged along the optical axis perform the imaging based on the j-th incident light, to obtain the image corresponding to the j-th incident light. For example, in a case where n=4 and j=2, the second reflecting element is moved and/or rotated to the first preset position, and the third reflecting element and the fourth reflecting element are moved and/or rotated to the second preset position, that is, the second reflecting element is disposed on the optical axis at the preset angle, the third reflecting element is disposed, in parallel to the optical axis, between the second lens group and the third lens group, and the fourth reflecting element is disposed, in parallel to the optical axis, between the third lens group and the fourth lens group. In this case, the second reflecting element reflects the light refracted by the first lens group to the first imaging plane to obtain the respective image; and at the same time, the second reflecting element receives the incident light from the object side and reflects the incident light to the second lens group, the light refracted by the second lens group is passed to the third lens group, and light refracted by the third lens group is passed to the fourth lens group, to obtain a respective image on the fourth imaging plane. That is, in this case, the zoom lens can obtain one image through the independent imaging of the first lens group, and can obtain another image through combination of the second lens group, the third lens group and the fourth lens group.

Figure 3:
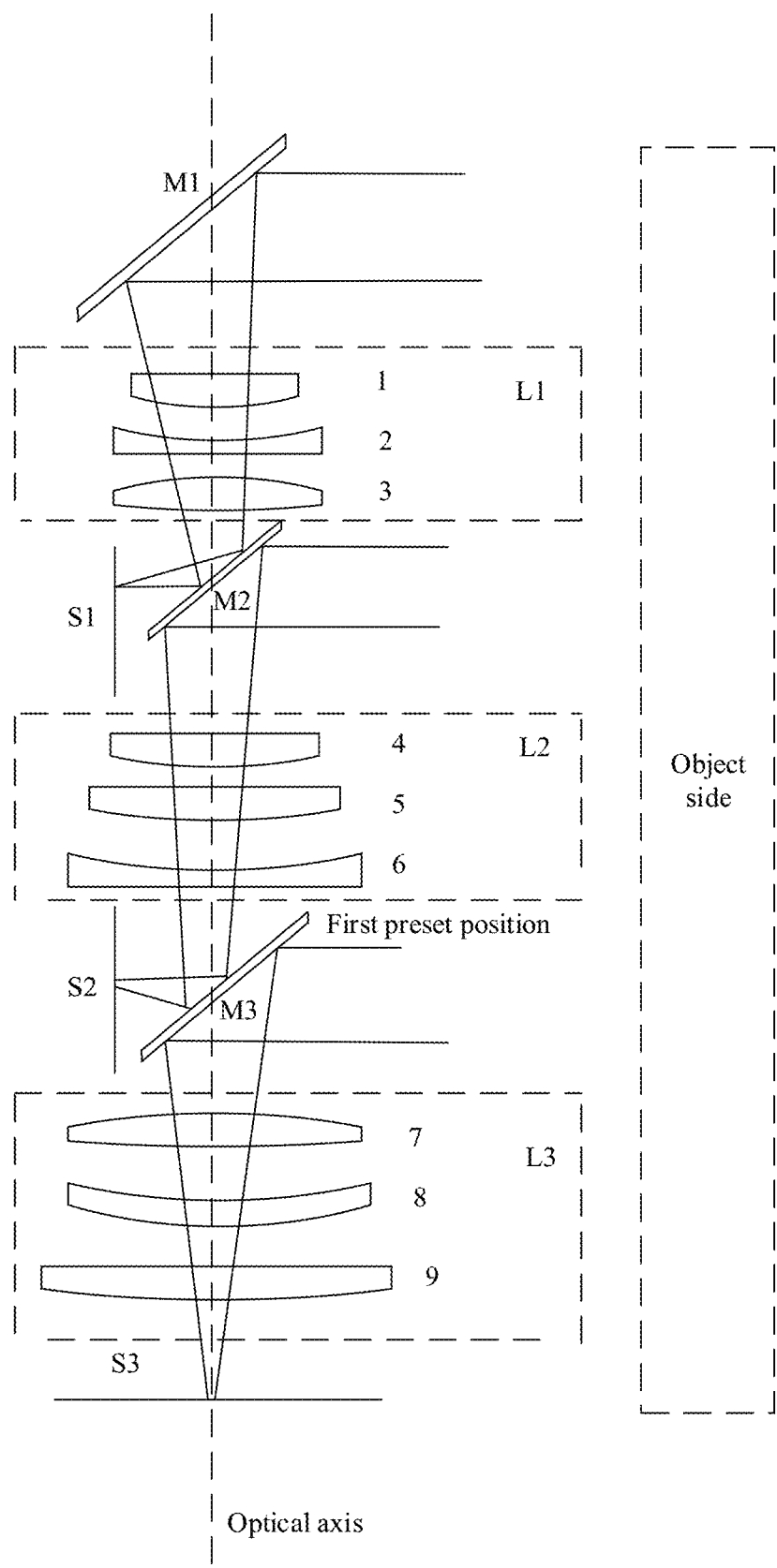
FIG. 3 is a second schematic structural diagram of the zoom lens provided in the embodiments of the present disclosure.

Based on FIG. 2, FIG. 3 is a second schematic structural diagram of the zoom lens provided in the embodiments of the present disclosure. As shown in FIG. 3, in the embodiments of the present disclosure, in the case where n=3, the zoom lens is composed of three lens groups L1, L2 and L3, three reflecting elements M1, M2 and M3, and three imaging planes S1, S2 and S3. The lens group L1 is composed of lenses 1, 2 and 3, the lens group L2 is composed of lenses 4, 5 and 6, and the lens group L3 is composed of lenses 7, 8 and 9. The reflecting elements M1, M2 and M3 may be the reflecting mirrors, or the liquid crystal reflectors. Each of the imaging planes S1, S2 and S3 is a light receiving plane equipped with the solid-state imaging element such as CCD or CMOS.

Further, in FIG. 3, the lens groups L1, L2 and L3 and the imaging plane S3 are arranged sequentially along the optical axis, that is, in the direction of the optical axis, the lenses 1 . . . 9 and the imaging plane S3 are arranged in order.

Further, in FIG. 3, the object side may be located on the right side of the three reflecting elements. The reflecting element M1 of the three reflecting elements may be fixed on the optical axis at an angle of preferably 45 degrees. The reflecting element M1 receives the incident light from the object side and reflects the incident light to the lens group L1. In other words, in the embodiments of the present disclosure, the incident light from the object side can be reflected by the reflecting element M1 to the lens group L1.

Further, in FIG. 3, the imaging planes S1 and S2 of the three imaging planes may be disposed, in parallel to the optical axis, between the lens groups L1, L2 and L3. Specifically, the imaging plane S1 is disposed, in parallel to the optical axis, between the lens groups L1 and L2, and the imaging plane S2 is disposed, in parallel to the optical axis, between the lens groups L2 and L3.

Further, in FIG. 3, the reflecting elements M2 and M3 of the three reflecting elements are all moved and/or rotated to the first preset direction. That is, the reflecting elements M2 and M3 are disposed at a certain angle and take the optical axis as the center. For example, the reflecting elements M2 and M3 may be disposed to take the optical axis as the center and define an angle of 45 degrees relative to the optical axis.

It should be noted that, in the embodiments of the preset disclosure, based on FIG. 3, the reflecting elements M2 and M3 of the zoom lens are all moved and/or rotated to the first preset position. Therefore, after the incident light from the object side is reflected by the reflecting element M1 to the lens group L1, the reflecting element M2 can receive the light refracted by the lens group L1 and reflect the received light to the imaging plane S1, to obtain, on the imaging plane S1, an image 1 corresponding to the imaging plane S1. At the same time, the reflecting element M2 can also receive the incident light from the object side and reflect the received incident light to the lens group L2, the light refracted by the lens group L2 is passed to the reflecting element M3, and through reflection of the reflecting element M3, an image 2 corresponding to the imaging plane S2 can be obtained on the imaging plane S2. Further, the reflecting element M3 can also receive the incident light from the object side and reflect the incident light to the lens group L3, the light refracted by the lens group L3 is passed directly to the imaging plane S3, to obtain, on the imaging plane S3, an image 3 corresponding to the imaging plane S3. It can be seen that, in FIG. 3, the lens groups L1, L2 and L3 can perform the imaging independently with the respective focal lengths. That is, for the same object side, the zoom lens can simultaneously obtain the image 1 with a focal length 1 corresponding to the lens group L1, the image 2 with a focal length 2 corresponding to the lens group L2, and the image 3 with a focal length 3 corresponding to the lens group L3.

Further, in the embodiments of the present disclosure, based on FIG. 3, when the reflecting elements M2 and M3 of the zoom lens are all moved and/or rotated to the first preset position, the zoom lens can obtain three different focal lengths through three independent states of the lens groups L1, L2 and L3.

Further, in the embodiments of the preset disclosure, when the zoom lens is composed of the three lens groups L1, L2 and L3, the three reflecting elements M1, M2 and M3, and the three imaging planes S1, S2 and S3, the reflecting elements M2 and M3 can be moved and/or rotated to enable the zoom lens to zoom. That is, the reflecting elements M2 and M3 are moved and/or rotated between the first preset position and the second preset position, so as to provide multiple different focal lengths through the free combinations of the lens groups L1, L2 and L3. For example, when the lens groups L1, L2 and L3 perform the imaging independently, the focal length 1, the focal length 2 and the focal length 3 are available. When the lens groups L1, L2 and L3 are combined to perform the imaging, a focal length 4 is available. When the lens groups L1 and L2 are combined to perform the imaging, a focal length 5 is available. When the lens groups L3 and L2 are combined to perform the imaging, a focal length 6 is available. In other words, in the zoom lens provided in the embodiments of the present disclosure, multiple different focal lengths are enabled for the multi-segment lens, the number of the available focal lengths is greatly increased, and the limitations on the zoom lens are broken through, thereby satisfying a wide range of the shooting scenes.

It should be noted that, in the related art, the imaging is mainly implemented in multiple optical paths by means of beam splitting, in which the luminous flux in each optical path is relatively small, and a dark image is resulted. However, in the embodiments of the present disclosure, with the provided zoom lens, the focal length can be changed by changing the position of the reflecting element(s), which can alleviate the problems of low luminous flux and dark images. Further, it also can avoid the problem of making the lens sizes in all directions similar to each other which would otherwise cause a large size of the zoom lens, thereby greatly reducing the size of the zoom lens in the embodiments of the present disclosure.

In the zoom lens provided by the embodiments of the present disclosure, n lens groups, n reflecting elements and n imaging planes are included, where n is an integer greater than or equal to 2. The n lens groups and the n-th imaging plane of the n imaging planes are arranged sequentially along the optical axis. The first reflecting element of the n reflecting elements is configured to receive first incident light from the object side and reflect the first incident light to the first lens group of the n lens groups. The i-th imaging plane of the n imaging planes is disposed, in parallel to the optical axis, between the i-th lens group and the (i+1)-th lens group of the n lens groups, where i is an integer greater than or equal to 1 and less than n. The j-th reflecting element of the n reflecting elements is disposed between the (j−1)-th lens group and the j-th lens group of the n lens groups, and is configured to be moved and/or rotated to enable the zoom lens to zoom, where j is an integer greater than 1 and less than or equal to n. That is, in the embodiments of the present disclosure, for the multi-segment zoom lens, by moving and/or rotating the n reflecting elements excepting the first reflecting element, the n lens groups not only can perform the imaging independently on the n imaging planes respectively, but also can be combined to perform the imaging on the n imaging planes; accordingly, multiple different focal lengths are enabled by means of the different states of the n lens groups, and multiple changes in the focal length is achieved. As such, the number of the available focal lengths is greatly increased, and the limitations on the zoom lens are broken through, thereby satisfying the wide range of shooting scenes.

Figure 4:
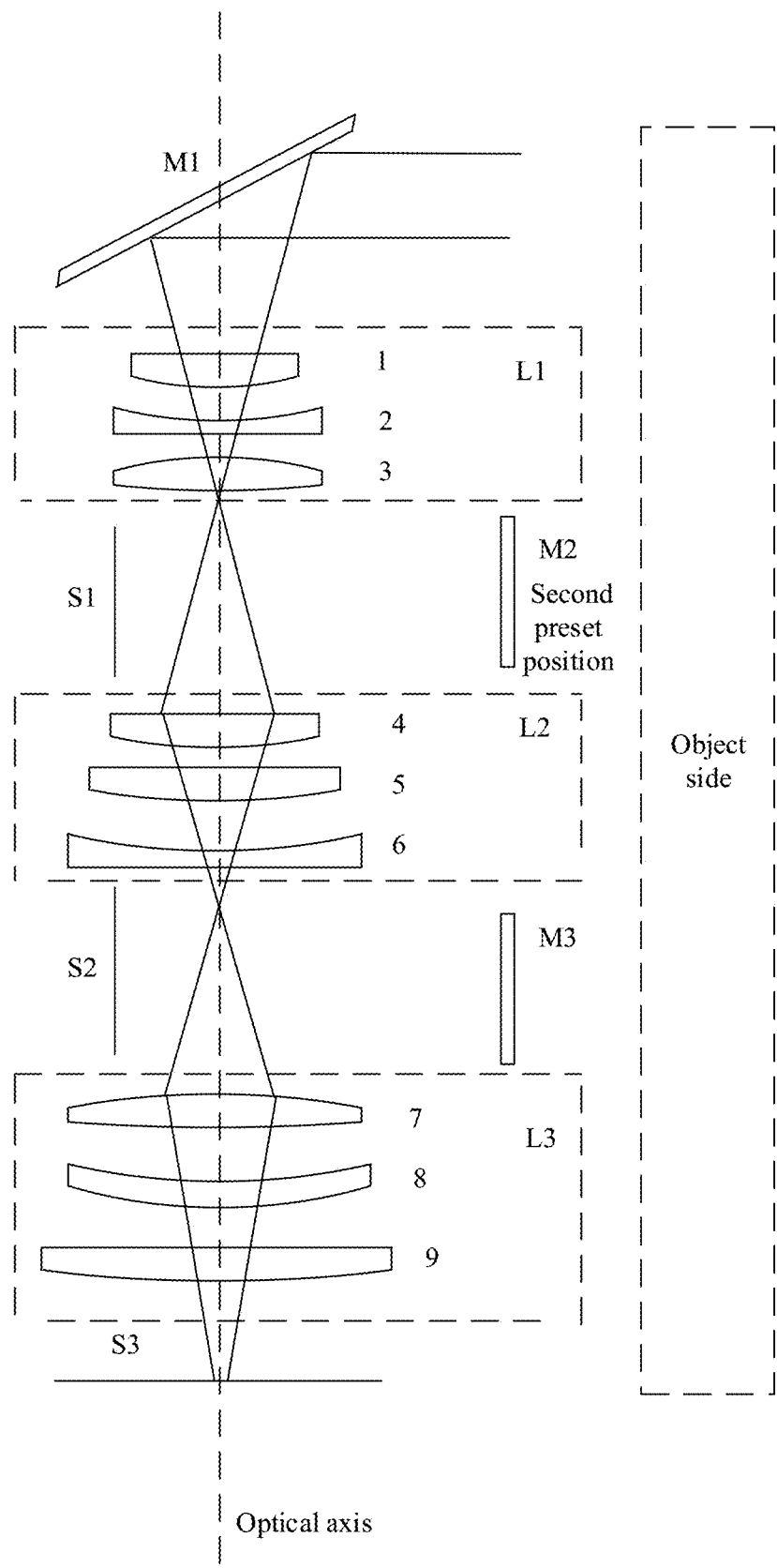
FIG. 4 is a third schematic structural diagram of the zoom lens provided in the embodiments of the present disclosure.

Based on the above embodiments, in another embodiment of the present disclosure, FIG. 4 illustrates a third schematic structural diagram of the zoom lens provided in the embodiments of the present disclosure. As shown in FIG. 4, in the embodiments of the present disclosure, in the case where n=3, the zoom lens is composed of three lens groups L1, L2 and L3, three reflecting elements M1, M2 and M3, and three imaging planes S1, S2 and S3. The lens group L1 is composed of lenses 1, 2 and 3, the lens group L2 is composed of lenses 4, 5 and 6, and the lens group L3 is composed of lenses 7, 8 and 9. The reflecting elements M1, M2 and M3 may be the reflecting mirrors, or the liquid crystal reflectors. Each of the imaging planes S1, S2 and S3 is a light receiving plane equipped with the solid-state imaging element such as CCD or CMOS.

Further, in FIG. 4, the lens groups L1, L2 and L3 and the imaging plane S3 are arranged sequentially along the optical axis, that is, in the direction of the optical axis, the lenses 1 . . . 9 and the imaging plane S3 are arranged in order.

Further, in FIG. 4, the object side may be located on the right side of the three reflecting elements. The reflecting element M1 of the three reflecting elements may be fixed on the optical axis at an angle of preferably 45 degrees. The reflecting element M1 receives the incident light from the object side and reflects the incident light to the lens group L1. In other words, in the embodiments of the present disclosure, the incident light from the object side can be reflected by the reflecting element M1 to the lens group L1.

Further, in FIG. 4, the imaging planes S1 and S2 of the three imaging planes may be disposed, in parallel to the optical axis, between the lens groups L1, L2 and L3. Specifically, the imaging plane S1 is disposed, in parallel to the optical axis, between the lens groups L1 and L2, and the imaging plane S2 is disposed, in parallel to the optical axis, between the lens groups L2 and L3.

Further, in FIG. 4, the reflecting elements M2 and M3 of the three reflecting elements are all moved and/or rotated to the second preset direction. That is, the reflecting elements M2 and M3 are disposed, in parallel to the optical axis, between the lens groups L1, L2 and L3. Specifically, the reflecting element M2 is disposed, in parallel to the optical axis, between the lens groups L1 and L2, and the reflecting element M3 is disposed, in parallel to the optical axis, between the lens groups L2 and L3. At this case, the reflecting element M2 and the imaging plane S1 are symmetrical with respect to the optical axis, and the reflecting element M3 and the imaging plane S2 are symmetrical with respect to the optical axis. The reflecting elements M2 and M3 and the imaging planes S1 and S2, each being in parallel to the optical axis, are disposed on two sides of the optical axis respectively, with the reflecting elements M2 and M3 located at the same side of the optical axis as the object side.

It should be noted that, in the embodiments of the present disclosure, based on FIG. 4, the reflecting elements M2 and M3 of the zoom lens are all moved and/or rotated to the second preset position. Therefore, after the incident light from the object side is reflected by the reflecting element M1 to the lens group L1, the lens group L2 can directly receive the light refracted by the lens group L1, and the light refracted by the lens group L2 is passed to the lens group L3. The light refracted by the L3 is passed directly onto the imaging plane S3, to obtain, on the imaging plane S3, an image 4 corresponding to the imaging plane S3. It can be seen that, in FIG. 4, the lens groups L1, L2 and L3 may be combined to perform the imaging with the respective focal lengths. That is, for the same object side, the zoom lens can obtain the image 4 with a focal length 4 that is obtained by combining the lens groups L1, L2 and L3.

Further, in the embodiments of the present disclosure, based on FIG. 4, when the reflecting elements M2 and M3 of the zoom lens are all moved and/or rotated to the second preset position, the zoom lens can obtain one focal length through the combination of the lens groups L1, L2 and L3.

Further, in the embodiments of the present disclosure, when the zoom lens is composed of the three lens groups L1, L2 and L3, the three reflecting elements M1, M2 and M3, and the three imaging planes S1, S2 and S3, the reflecting elements M2 and M3 can be moved and/or rotated to enable the zoom lens to zoom. That is, the reflecting elements M2 and M3 are moved and/or rotated between the first preset position and the second preset position, so as to provide multiple different focal lengths through the free combinations of the lens groups L1, L2 and L3. For example, when the lens groups L1, L2 and L3 are combined to perform the imaging, the focal length 4 is available to obtain the image 4. In other words, in the zoom lens provided in the embodiments of the present disclosure, the number of the available focal lengths of the zoom lens is greatly increased, and the limitations on the zoom lens are broken through, thereby satisfying the wide range of shooting scenes.

Figure 5:
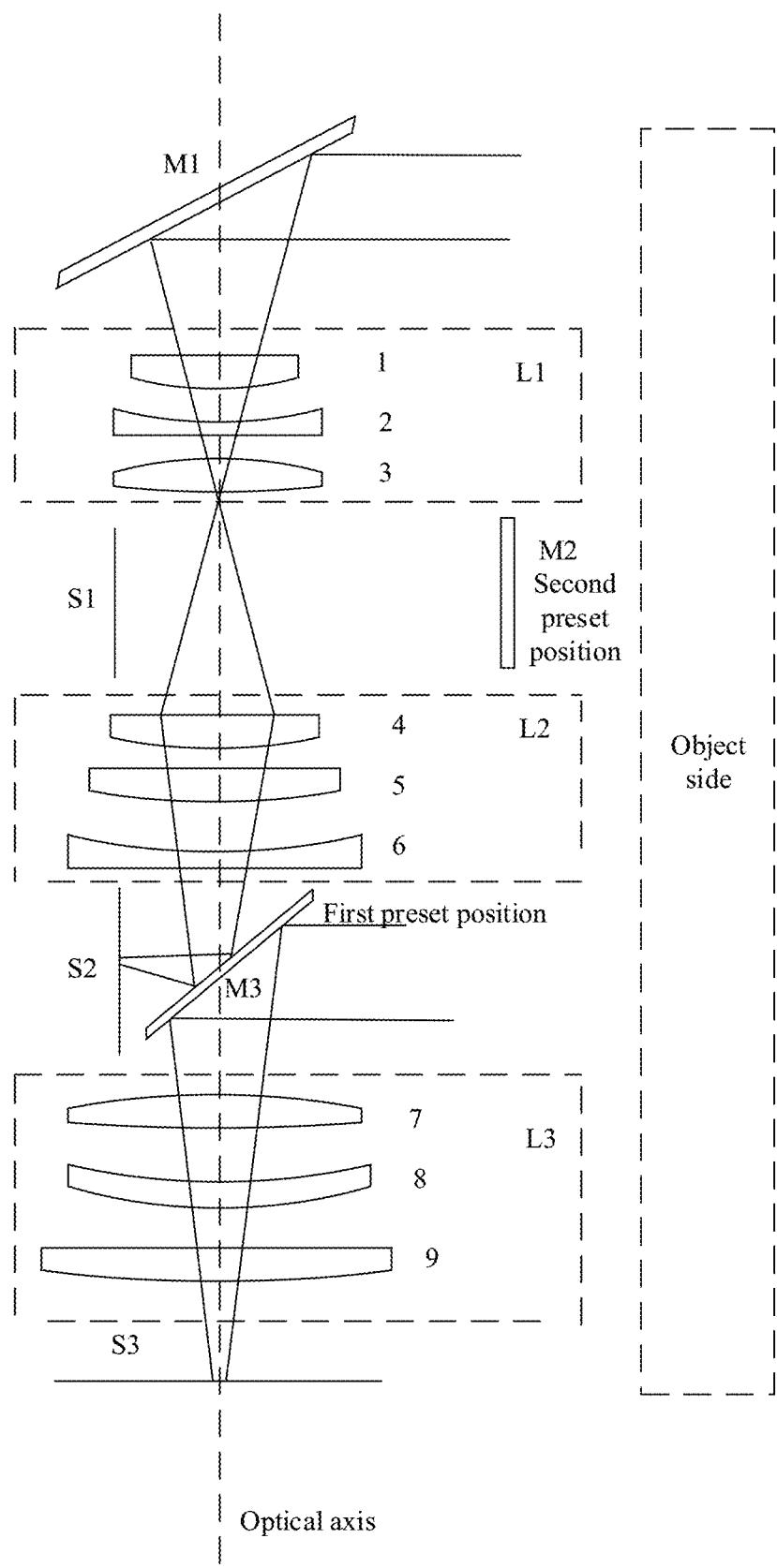
FIG. 5 is a fourth schematic structural diagram of the zoom lens provided in the embodiments of the present disclosure.

FIG. 5 is a fourth schematic structural diagram of the zoom lens provided in the embodiments of the present disclosure. As shown in FIG. 5, in the embodiments of the present disclosure, the zoom lens is composed of three lens groups L1, L2 and L3, three reflecting elements M1, M2 and M3, and three imaging planes S1, S2 and S3. The lens group L1 is composed of lenses 1, 2 and 3, the lens group L2 is composed of lenses 4, 5 and 6, and the lens group L3 is composed of lenses 7, 8 and 9. The reflecting elements M1, M2 and M3 may be the reflecting mirrors, or the liquid crystal reflectors. Each of the imaging planes S1, S2 and S3 is a light receiving plane equipped with the solid-state imaging element such as CCD or CMOS.

Further, in FIG. 5, the lens groups L1, L2 and L3 and the imaging plane S3 are arranged sequentially along the optical axis, that is, in the direction of the optical axis, the lenses 1 . . . 9 and the imaging plane S3 are arranged in order.

Further, in FIG. 5, the object side may be located on the right side of the three reflecting elements. The reflecting element M1 of the three reflecting elements may be fixed in the optical axis at an angle of preferably 45 degrees. The reflecting element M1 receives the incident light from the object side and reflects the incident light to the lens group L1. In other words, in the embodiments of the present disclosure, the incident light from the object side can be reflected by the reflecting element M1 to the lens group L1.

Further, in FIG. 5, the imaging planes S1 and S2 of the three imaging planes may be disposed, in parallel to the optical axis, between the lens groups L1, L2 and L3. Specifically, the imaging plane S1 is disposed, in parallel to the optical axis, between the lens groups L1 and L2, and the imaging plane S2 is disposed, in parallel to the optical axis, between the lens groups L2 and L3.

Further, in FIG. 5, the reflecting element M2 of the three reflecting elements is moved and/or rotated to the second preset position, and the reflecting element M3 is moved and/or rotated to the first preset position. That is, the reflecting element M2 is disposed, in parallel to the optical axis, between the lens groups L1 and L2, and the reflecting element M3 is disposed at a certain angle and take the optical axis as the center. For example, the reflecting element M3 may be disposed between the lens groups L2 and L3 at an angle of 45 degrees with respect to the optical axis, and take the optical axis as the center.

It should be noted that, in the embodiments of the present disclosure, based on FIG. 5, the reflecting element M2 of the zoom lens is moved and/or rotated to the second preset position, and the reflecting element M3 is moved and/or rotated to the first preset position. Therefore, after the incident light from the object side is reflected by the reflecting element M1 to the lens group L1, the lens group L2 can directly receive the light refracted by the lens group L1. The light refracted by the lens group L2 is passed to the reflecting element M3, and is reflected by the reflecting element M3 to obtain an image 5 on the imaging plane S2. Further, the reflecting element M3 can also receive the incident light from the object side and reflect the received incident light to the lens group L3. The light refracted by the lens group L3 is directly passed onto the imaging plane S3 to obtain, on the imaging plane S3, the image 3 corresponding to the imaging plane S3. It can be seen that, in FIG. 5, the lens groups L1 and L2 can be combined to perform the imaging, and the lens group L3 can perform the imaging independently. That is, for the same object side, the zoom lens can simultaneously obtain the image 5 with the focal length 5 that is obtained by combining the lens groups L1 and L2, and the image 3 with the focal length 3 corresponding to the lens group L3.

Further, in the embodiments of the present disclosure, based on FIG. 5, when the reflecting element M2 of the zoom lens is moved and/or rotated to the second preset position, and the reflecting element M3 is moved and/or rotated to the first preset position, the zoom lens can obtain two different focal lengths, through the combination state of the lens groups L1 and L2 and the independent state of the lens group L3.

Further, in the embodiments of the present disclosure, when the zoom lens is composed of the three lens groups L1, L2 and L3, the three reflecting elements M1, M2 and M3, and the three imaging planes S1, S2 and S3, the reflecting elements M2 and M3 can be moved and/or rotated to enable the zoom lens to zoom. That is, the reflecting elements M2 and M3 are moved and/or rotated between the first preset position and the second preset position, so as to obtain multiple different focal lengths through the free combinations of the lens groups L1, L2 and L3. For example, when the lens groups L1 and L2 are combined to perform the imaging, the focal length 5 is available. In other words, in the zoom lens provided in the embodiments of the present disclosure, the number of the available focal lengths is greatly increased, and the limitations on the zoom lens are broken through, thereby satisfying the wide range of shooting scenes.

Figure 6:
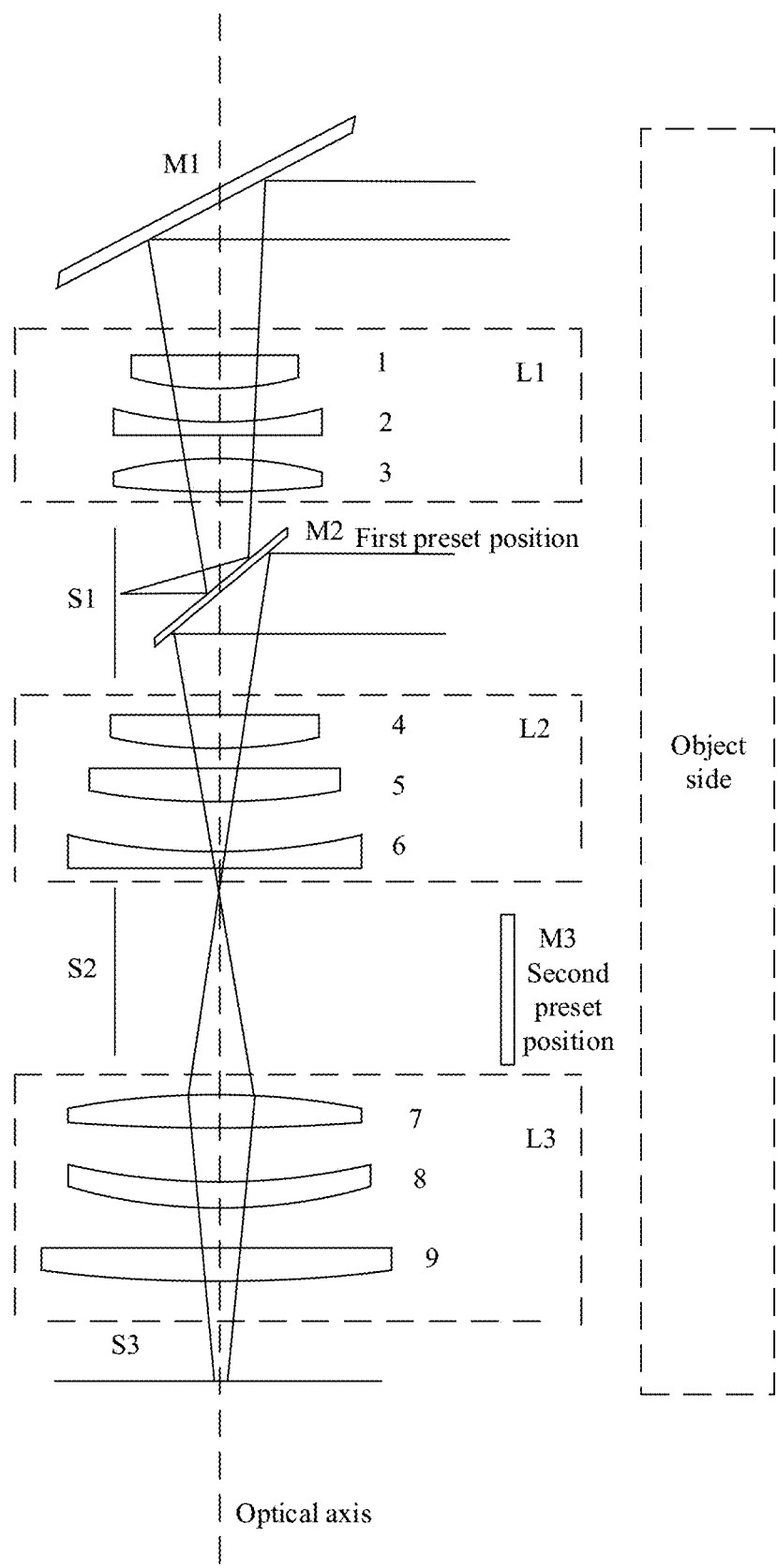
FIG. 6 is a fifth schematic structural diagram of the zoom lens provided in the embodiments of the present disclosure.

FIG. 6 is a fifth schematic structural diagram of the zoom lens provided in the embodiments of the present disclosure. As shown in FIG. 6, in the embodiments of the present disclosure, in the case where the zoom lens is composed of three lens groups L1, L2 and L3, three reflecting elements M1, M2 and M3, and three imaging planes S1, S2 and S3. The lens group L1 is composed of lenses 1, 2 and 3, the lens group L2 is composed of lenses 4, 5 and 7, and the lens group L3 is composed of lenses 7, 8 and 9. The reflecting elements M1, M2 and M3 may be reflecting mirrors, or the liquid crystal reflectors. Each of the imaging planes S1, S2 and S3 is a light receiving plane equipped with the solid-state imaging element such as CCD or CMOS.

Further, in FIG. 6, the lens groups L1, L2 and L3 and the imaging plane S3 are arranged sequentially along the optical axis, that is, in the direction of the optical axis, the lenses 1 . . . 9 and the imaging plane S3 are arranged in order.

Further, in FIG. 6, the object side may be located on the right side of the three reflecting elements. The reflecting element M1 of the three reflecting elements may be fixed on the optical axis at an angle of preferably 45 degrees. The reflecting element M1 receives the incident light from the object side and reflects the incident light to the lens group L1. In other words, in the embodiments of the present disclosure, the incident light from the object side can be reflected by the reflecting element M1 to the lens group L1.

Further, in FIG. 6, the imaging planes S1 and S2 of the three imaging planes may be disposed, in parallel to the optical axis, between the lens groups L1, L2 and L3. Specifically, the imaging plane S1 is disposed, in parallel to the optical axis, between the lens groups L1 and L2, and the imaging plane S2 is disposed, in parallel to the optical axis, between the lens groups L2 and L3.

Further, in FIG. 6, the reflecting elements M2 of the three reflecting elements is moved and/or rotated to the first preset position, and the reflecting elements M3 is moved and/or rotated to the second preset position. That is, the reflecting element M3 is disposed, in parallel to the optical axis, between the lens groups L2 and L3. The reflecting element M2 is disposed at a certain angle and takes the optical axis as the center. For example, the reflecting element M2 may be disposed between the lens groups L1 and L2 at an angle of 45 degrees with respect to the optical axis, and take the optical axis as the center.

It should be noted that, in the embodiments of the present disclosure, based on FIG. 6, the reflecting element M2 of the zoom lens is moved and/or rotated to the first preset position, and the reflecting element M3 is moved and/or rotated to the second preset position. Therefore, after the incident light from the object side is reflected by the reflecting element M1 to the lens group L1, the reflecting element M2 can receive the light refracted by the lens group L1 and reflect the received light to the imaging plane S1, to obtain, on the imaging plane S1, the image 1 corresponding to the imaging plane S1. At the same time, the reflecting element M2 can also receive the incident light from the object side and reflect the received incident light to the lens group L2. The light refracted by the lens group L2 is passed to the lens group L3, and the light refracted by the lens group L3 is directly passed onto the imaging plane S3, to obtain an image 6 on the imaging plane S3. It can be seen that, in FIG. 6, the lens groups L2 and L3 can be combined to perform the imaging, and the lens group L1 can perform the imaging independently. That is, for the same object side, the zoom lens can simultaneously obtain the image 6 with a focal length 6 that is obtained by combing the lens groups L3 and L2, and the image 1 with the focal length 1 corresponding to the lens group L1.

Further, in the embodiments of the present disclosure, based on FIG. 6, when the reflecting element M2 of the zoom lens is moved and/or rotated to the first preset position, and the reflecting element M3 is moved and/or rotated to the second preset position, the zoom lens can obtain two different focal lengths, through the combination state of the lens groups L3 and L2 and the independent state of the lens group L1.

Further, in the embodiments of the preset disclosure, when the zoom lens is composed of the three lens groups L1, L2 and L3, the three reflecting elements M1, M2 and M3, and the three imaging planes S1, S2 and S3, the reflecting elements M2 and M3 can be moved and/or rotated to enable the zoom lens to zoom. That is, the reflecting elements M2 and M3 are moved and/or rotated between the first preset position and the second preset position, so as to provide multiple different focal lengths through the free combinations of the lens groups L1, L2 and L3. For example, when the lens groups L3 and L2 are combined to perform the imaging, the focal length 6 is available. In other words, in the zoom lens provided in the embodiments of the present disclosure, the number of the available focal lengths is greatly increased, and the limitations on the zoom lens are broken through, thereby satisfying the wide range of shooting scenes.

The zoom lens is provided in the embodiments of the present disclosure. The zoom lens includes the n lens groups, the n reflecting elements and the n imaging planes, where n is an integer greater than or equal to 2. The n lens groups and n-th imaging plane of the n imaging planes are arranged sequentially along an optical axis. The first reflecting element of the n reflecting elements is configured to receive the first incident light of the object side and reflect the first incident light to the first lens group of the n lens groups. The i-th imaging plane of the n imaging planes is disposed, in parallel to the optical axis, between the i-th lens group and the (i+1)-th lens group of the n lens groups, where i is an integer greater than or equal to 1 and less than n. In other words, in the embodiments of the present disclosure, for the multi-segment zoom lens, by moving and/or rotating the n reflecting elements excepting the first reflecting element, the n lens groups not only can perform the imaging independently on the n imaging planes respectively, but also can be combined to perform the imaging on the n imaging planes; accordingly, multiple different focal lengths are enabled by means of the different states of the n lens groups, and multiple changes in the focal length is achieved. As such, the number of the available focal lengths is greatly increased, and the limitations on the zoom lens are broken through, thereby satisfying the wide range of shooting scenes.

Figure 7:
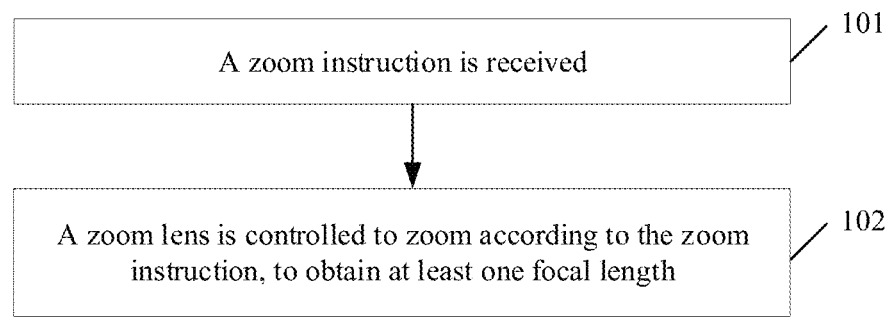
FIG. 7 illustrates a zoom method provided in the embodiments of the present disclosure.

Based on the above-mentioned embodiments of the present disclosure, in further embodiments of the present disclosure, FIG. 7 illustrates a zoom method provided in the embodiments of the present disclosure. The zoom method is implemented in a terminal equipped with the zoom lens mentioned above. As shown in FIG. 7, the zoom method includes the following operations.

At block 101, a zoom instruction is received.

In the embodiments of the preset disclosure, the terminal can receive the zoom instruction. Specifically, the zoom instruction may be configured to instruct different focal lengths to be obtained.

It should be noted that, in the embodiments of the present disclosure, the zoom lens may include the n lens groups L1 . . . Ln, the n reflecting elements M1 . . . Mn, and the n imaging planes S1 . . . Sn, where n is an integer greater than or equal to 2.

Further, in the embodiments of the present disclosure, any one of the lens groups L1 . . . Ln may include at least one optical lens.

It should be noted that, in the embodiments of the present disclosure, any one of the n reflecting elements M1 . . . Mn may be a reflecting mirror or a liquid crystal reflector, which is not limited here.

Further, in the embodiments of the present disclosure, any one of the n imaging planes S1 . . . Sn is a light receiving plane equipped with the solid-state imaging element such as CCD or CMOS.

It should be noted that, in the embodiments of the present disclosure, the n lens groups L1 . . . Ln and the n-th imaging plane of the n imaging planes may be arranged sequentially along the optical axis. That is, in the direction of the optical axis, the lens groups L1 . . . Ln and the n-th imaging plane Sn are arranged in order.

It should be noted that, in the embodiments of the present disclosure, the optical axis may be the line connecting centers of the spherical surfaces of all the lenses of the n lens groups L1 . . . Ln.

Further, in the embodiments of the present disclosure, the first reflecting element M1 of the n reflecting elements may be fixed on the optical axis at the preset angle, and it may receive the first incident light from the object side and reflect the first incident light to the first lens group L1 of the n lens groups.

It should be noted that, in the embodiments of the present disclosure, the i-th imaging plane S1 of the n imaging planes S1 . . . Sn may be disposed, in parallel to the optical axis, between the i-th lens group and the (i+1)-th lens group of the n lens groups L1 . . . Ln, where i is an integer greater than or equal to 1 and less than n.

Further, in the embodiments of the present disclosure, the j-th reflecting element Mj of the n reflecting elements is disposed between the (j–1)-th lens group and the j-th lens group of the n lens groups, and is configured to be moved and/or rotated to enable the zoom lens to zoom, where j is an integer greater than 1 and less than or equal to n.

At block 102, the zoom lens is controlled to zoom according to the zoom instruction, to obtain at least one focal length.

In the embodiments of the present disclosure, after receiving the zoom instruction, the terminal can control the zoom lens to zoom according to the zoom instruction, to obtain the at least one focal length. Specifically, the zoom lens may change the focal length by controlling other reflecting elements of the n reflecting elements excepting the first reflecting element to move and/or rotate between the first preset direction and the second preset direction.

It should be noted that, in the embodiments of the present disclosure, the zoom lens may further include the control device. Specifically, the control device is configured to control the j-th reflecting element Mj to move and/or rotate to the first preset position or the second preset position.

Further, in the embodiments of the present disclosure, the first preset position may be a position where the respective reflecting element takes the optical axis as the center. Specifically, when the j-th reflecting element Mj is in the first preset position, it may be provided on the optical axis at the preset angle, i.e., this reflecting element may intersect the optical axis with the preset angle defined therebetween.

Further, in the embodiments of the present disclosure, the second preset position may be a position where the respective reflecting element is parallel to the optical axis. Specifically, when the j-th reflecting element Mj is in the second preset position, it may be disposed, in parallel to the optical axis, between the (j–1)-th lens group and the j-th lens group of the n lens groups L1 . . . Ln. When the j-th reflecting element Mj is in the second preset position, the j-th reflecting element Mj and the (j–1)-th imaging plane are symmetrical with respect to the optical axis.

It should be noted that, in the embodiments of the present disclosure, when the j-th reflecting element Mj is moved and/or rotated to the first preset position, the j-th reflecting element Mj may reflect the light refracted by the (j–1)-th lens group to the (j–1) imaging plane, so that the image corresponding to the (j–1)-th imaging plane can be obtained on the (j–1)-th imaging plane.

Figure 8:
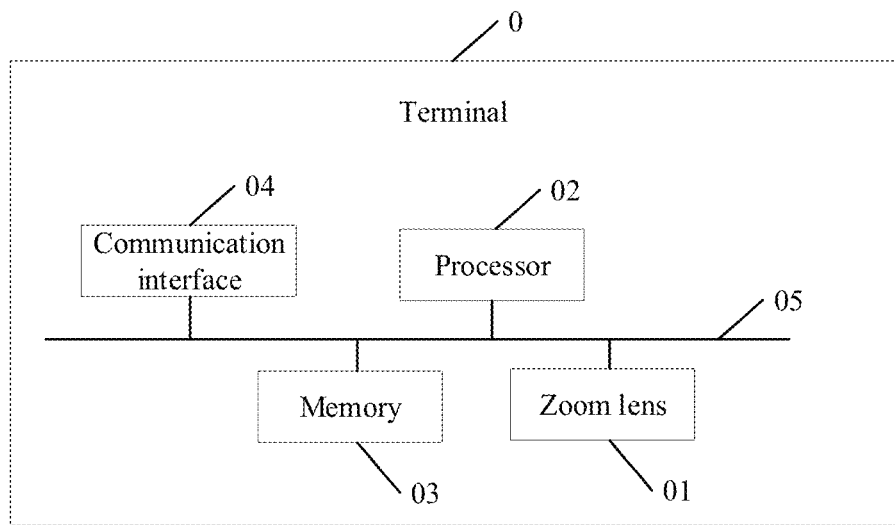
FIG. 8 is a schematic diagram illustrating a composition structure of a terminal provided in the embodiments of the present disclosure.

FIG. 8 is a schematic diagram illustrating a composition structure of the terminal provided in the embodiments of the present disclosure. As shown in FIG. 8, the terminal 0 provided in the embodiments of the present disclosure may include the zoom lens 01, a processor 02 and a memory 03 storing instructions executable by the processor 02. Further, the terminal 0 may also include a communication interface 04 and a bus 05, that the bus 05 is configured to connect the processor 02, the memory 03 and the communication interface 04.

Further, in the embodiments of the present disclosure, the zoom lens 01 may include n lens groups, n reflecting elements, and n imaging planes, where n is an integer greater than or equal to 2. The n lens groups and the n-th imaging plane of the n imaging planes are arranged sequentially along the optical axis. The first reflecting element of the n reflecting elements is configured to receive incident light from the object side and reflect the first incident light to the first lens group of the n lens groups. The i-th imaging plane of the n imaging planes is disposed, in parallel to the optical axis, between the i-th lens group and the (i+1)-th lens group of the n lens groups, where i is an integer greater than or equal to 1 and less than n. The j-th reflecting element of the n reflecting elements is disposed between the (j–1)-th lens group and the j-th lens group of the n lens groups, and is configured to be moved and/or rotated to enable the zoom lens to zoom, where j is an integer greater than 1 and less than or equal to n.

In the embodiments of the present disclosure, the processor 02 may be at least one of an application specific integrated circuit (ASIC), a digital signal processor (DSP), a digital signal processing device (DSPD), a programmable logic device (PLD), a field programmable gate array (FPGA), a central processing unit (CPU), a controller, a microcontroller and a microprocessor. It can be understood that, for different devices, other electronic elements may also be adopted for implementing the functions of the processor, which are not limited here.

The zoom method provided in the embodiments of the present disclosure is applied to the terminal that is equipped with the zoom lens. In the embodiments of the present disclosure, for the multi-segment zoom lens, by moving and/or rotating the n reflecting elements excepting the first reflecting element, the n lens groups not only can perform the imaging independently on the n imaging planes respectively, but also can be combined to perform the imaging on the n imaging planes;

accordingly, multiple different focal lengths are enabled by means of the different states of the n lens groups, and multiple changes in the focal length is achieved. As such, the number of the available focal lengths is greatly increased, and the limitations on the zoom lens are broken through, thereby satisfying the wide range of shooting scenes.

A computer-readable storage medium is further provided in the embodiments of the present disclosure, which storage medium stores programs thereon. The programs when being executed by the processor, causes the above-mentioned zoom method to be implemented.

Specifically, program instructions corresponding to the zoom method in the embodiments may be stored on a storage medium, such as an optical disk, a hard disk, and a U disk. When the program instructions corresponding to the zoom method in the storage medium are read or executed by an electronic device, at least the following operations are performed:

Receiving the zoom instruction; and

Controlling the zoom lens to zoom according to the zoom instruction.

Those skilled in the art should understand that, the embodiments of the present disclosure may be embodied as methods, displays or computer program products. Therefore, the embodiments of the present disclosure may be implemented in hardware, software or combination of software and hardware. Moreover, the embodiments of the present disclosure may be implemented in a computer program product embodied as one or more computer-usable storage mediums (including but not limited to a disk storage, an optical storage, etc.) containing computer-usable program codes.

The present disclosure is described with reference to the flowcharts and/or block diagrams of the methods, devices (systems) and computer program products in the embodiments of the present disclosure. It should be understood that, each process in the flowcharts and/or each block in the block diagrams can be implemented by the computer program instructions, and combinations of processes in the flowcharts and/or blocks in the block diagrams can also be implemented by the computer program instructions. These computer program instructions can be provided to a processor of a general-purpose computer, a special-purpose computer, an embedded processor or other programmable data processing devices to produce a machine, so that instructions executed by the processor of the computer or other programmable data processing devices produce means configured to perform the functions specified in one or more processes in the flowcharts and/or one or more blocks in the block diagrams.

These computer program instructions can also be stored in computer-readable memories that can direct the computer or other programmable data processing devices to work in a specific manner, so that the instructions stored in the computer-readable memories produce an article of manufacture including instruction means. The instruction means perform the functions specified in the one or more processes in the flowcharts and/or the one or more blocks in the block diagrams.

These computer program instructions can also be loaded on the computer or other programmable data processing devices, and a series of operations are executed on the computer or other programmable data processing devices to produce computer-implemented processing, so that the instructions executed on the computer or other programmable data processing devices provide operations that are used to perform the functions specified in the one or more processes in the flowcharts and/or the one or more blocks in the block diagrams.

The above-mentioned embodiments are some embodiments of the present disclosure, which are not used to limit the protection scope of the present disclosure.

INDUSTRIAL APPLICABILITY

The zoom lens, the zoom method and the storage medium are provided in the embodiments of the present disclosure. The zoom lens includes the n lens groups, the n reflecting elements and the n imaging planes, where n is an integer greater than or equal to 2. The n lens groups and the n-th imaging plane of the n imaging planes are arranged sequentially along the optical axis. The first reflecting element of the n reflecting elements is configured to receive incident light from the object side and reflect the first incident light to the first lens group of the n lens groups. The i-th imaging plane of the n imaging planes is disposed, in parallel to the optical axis, between the i-th lens group and the (i+1)-th lens group of the n lens groups, where i is an integer greater than or equal to 1 and less than n. The j-th reflecting element of the n reflecting elements is disposed between the (j−1)-th lens group and the j-th lens group of the n lens groups, and is configured to be moved and/or rotated to enable the zoom lens to zoom, where j is an integer greater than 1 and less than or equal to 1. In other words, in the embodiments of the present disclosure, for the multi-segment zoom lens, by moving and/or rotating the n reflecting elements excepting the first reflecting element, the n lens groups not only can perform the imaging independently on the n imaging planes respectively, but also can be combined to perform the imaging on the n imaging planes; accordingly, multiple different focal lengths are enabled by means of the different states of the n lens groups, and multiple changes in the focal length is achieved. As such, the number of the available focal lengths is greatly increased, and the limitations on the zoom lens are broken through, thereby satisfying the wide range of shooting scenes.

What is claimed is:

1. A zoom lens, comprising:
n lens groups, n reflecting elements and n imaging planes, where n is an integer greater than or equal to 2;
wherein the n lens groups and an n-th imaging plane of the n imaging planes are arranged sequentially along an optical axis of the zoom lens;
a first reflecting element of the n reflecting elements is configured to receive first incident light from an object side, and reflect the first incident light to a first lens group of the n lens groups, the object side being located on one side of the optical axis;
an i-th imaging plane of the n imaging planes is disposed, in parallel to the optical axis, between an i-th lens group and an (i+1)-th lens group of the n lens groups, a first imaging plane to an (n−1)-th imaging plane of the n imaging planes being located on a side of the optical axis that is opposite to the object side, where i is an integer greater than or equal to 1 and less than n; and a j-th reflecting element of the n reflecting elements is disposed between a (j−1)-th lens group and a j-th lens group of the n lens groups, and is configured to be moved or rotated to enable the zoom lens to zoom, where j is an integer greater than 1 and less than or equal to n.

2. The zoom lens according to claim 1, further comprising:

a control device, configured to control the j-th reflecting element to move or rotate between a first preset position and a second preset position;

wherein when the j-th reflecting element is in the first preset position, the j-th reflecting element is provided on the optical axis at a preset angle and takes the optical axis as a center; and when the j-th reflecting element is in the second preset position, the j-th reflecting element is parallel to the optical axis.

3. The zoom lens according to claim 2, wherein when the j-th reflecting element is moved or rotated to the first preset position, the j-th reflecting element is configured to reflect light refracted by the (j−1)-th lens group to a (j−1)-th imaging plane, to obtain an image on the (j−1)-th imaging plane; and the j-th reflecting element is further configured to receive j-th incident light from the object side, and reflect the j-th incident light to the j-th lens group of the n lens groups.

4. The zoom lens according to claim 3, wherein when the j-th reflecting element of the n reflecting elements is moved or rotated to the first preset position, and other reflecting elements of the n reflecting elements, excepting the first reflecting element and the j-th reflecting element, are moved or rotated to the second preset position, the first lens group to the (j−1)-th lens group of the n lens groups perform imaging based on the first incident light, to obtain an image corresponding to the first incident light; and the j-th lens group to a n-th lens group of the n lens groups perform the imaging based on the j-th incident light, to obtain an image corresponding to the j-th incident light.

5. The zoom lens according to claim 2, wherein when other reflecting elements of the n reflecting elements excepting the first reflecting element are all moved or rotated to the first preset position, any one of the n lens groups performs imaging independently based on corresponding incident light from the object side, to obtain n images on the n imaging planes, with each of the n imaging planes corresponding to one image.

6. The zoom lens according to claim 2, wherein when other reflecting elements of the n reflecting elements excepting the first reflecting element are all moved or rotated to the second preset position, all the n lens groups are combined to perform imaging based on the first incident light, to obtain, on the n-th imaging plane, an image corresponding to the first incident light.

7. The zoom lens according to claim 2, wherein when the j-th reflecting element is in the second preset position, the j-th reflecting element and a (j−1)-th imaging plane are symmetrical with respect to the optical axis, and the j-th reflecting element is located on a same side of the optical axis as the object side.

8. The zoom lens according to claim 1, wherein any one of the n lens groups comprises at least one optical lens.

9. The zoom lens according to claim 1, wherein any one of the n reflecting elements is a reflecting mirror or a liquid crystal reflector.

10. The zoom lens according to claim 1, wherein each of the n imaging planes is a light receiving plane equipped with a charge-coupled device (CCD) or a complementary metal oxide semiconductor (CMOS).

11. The zoom lens according to claim 1, wherein the first reflecting element is disposed in front of the first lens group, and is fixed on the optical axis at a preset angle.

12. The zoom lens according to claim 1, wherein the optical axis is a line connecting centers of spherical surfaces of all lenses of the n lens groups.

13. The zoom lens according to claim 1, wherein the n-th imaging plane is perpendicular to the optical axis.

14. A zoom method, applied to a terminal equipped with a zoom lens, the zoom lens comprising n lens groups, n reflecting elements and n imaging planes, where n is an integer greater than or equal to 2;

wherein the n lens groups and an n-th imaging plane of the n imaging planes are arranged sequentially along an optical axis of the zoom lens; a first reflecting element of the n reflecting elements is configured to receive first incident light from an object side, and reflect the first incident light to a first lens group of the n lens groups, the object side being located on one side of the optical axis; an i-th imaging plane of the n imaging planes is disposed, in parallel to the optical axis, between an i-th lens group and an (i+1)-th lens group of the n lens groups, a first imaging plane to an (n−1)-th imaging plane of the n imaging planes being located on a side of the optical axis that is opposite to the object side, where i is an integer greater than or equal to 1 and less than n; and a j-th reflecting element of the n reflecting elements is disposed between a (j−1)-th lens group and a j-th lens group of the n lens groups, and is configured to be moved or rotated to enable the zoom lens to zoom, where j is an integer greater than 1 and less than or equal to n; and wherein the method comprises:

receiving a zoom instruction; and controlling the zoom lens to zoom according to the zoom instruction, to obtain at least one focal length.

15. The method according to claim 14, wherein the zoom lens further comprises a control device; and wherein controlling the zoom lens to zoom according to the zoom instruction to obtain at least one focal length comprises:

controlling, by the control device, the j-th reflecting element to move or rotate between a first preset position and a second preset position according to the zoom instruction, to obtain the at least one focal length, wherein when the j-th reflecting element is in the first preset position, the j-th reflecting element is provided on the optical axis at a preset angle and takes the optical axis as a center; and when the j-th reflecting element is in the second preset position, the j-th reflecting element is parallel to the optical axis.

16. The method according to claim 15, wherein when the j-th reflecting element is moved or rotated to the first preset position, the method further comprises:

controlling the j-th reflecting element to reflect light refracted by the (j−1)-th lens group to a (j−1)-th imaging plane, to obtain an image on the (j−1)-th imaging plane; and controlling the j-th reflecting element to receive j-th incident light from the object side, and reflect the j-th incident light to the j-th lens group of the n lens groups.

17. A terminal, comprising:
a zoom lens, the zoom lens comprising n lens groups, n reflecting elements, and n imaging planes, where n is an integer greater than or equal to 2;
wherein the n lens groups and an n-th imaging plane of the n imaging planes are arranged sequentially along an optical axis of the zoom lens;
a first reflecting element of the n reflecting elements is configured to receive first incident light from an object side, and reflect the first incident light to a first lens group of the n lens groups, the object side being located on one side of the optical axis;
an i-th imaging plane of the n imaging planes is disposed, in parallel to the optical axis, between an i-th lens group and an (i+1)-th lens group of the n lens groups, a first imaging plane to an (n−1)-th imaging plane of the n imaging planes being located on a side of the optical axis that is opposite to the object side, where i is an integer greater than or equal to 1 and less than n; and
a j-th reflecting element of the n reflecting elements is disposed between a (j−1)-th lens group and a j-th lens group of the n lens groups, and is configured to be moved or rotated to enable the zoom lens to zoom, where j is an integer greater than 1 and less than or equal to n,
wherein the j-th reflecting element is movable or rotatable to a first preset position, at which position, the j-th reflecting element is provided on the optical axis at a preset angle and takes the optical axis as a center.

18. The terminal according to claim 17, wherein when the j-th reflecting element is moved or rotated to the first preset position,
the j-th reflecting element is configured to reflect light refracted by the (j−1)-th lens group to a (j−1)-th imaging plane, to obtain an image on the (j−1)-th imaging plane, and
the j-th reflecting element is further configured to receive j-th incident light from the object side, and reflect the j-th incident light to the j-th lens group of the n lens groups.

19. The terminal according to claim 18, wherein the j-th reflecting element is movable or rotatable to a second preset position, at which position, the j-th reflecting element is parallel to the optical axis and is located on a same side of the optical axis as the object side.

20. The terminal according to claim 19, wherein when the j-th reflecting element of the n reflecting elements is moved or rotated to the first preset position, and other reflecting elements of the n reflecting elements, excepting the first reflecting element and the j-th reflecting element, are moved or rotated to the second preset position, the first lens group to the (j−1)-th lens group of the n lens groups perform imaging based on the first incident light, to obtain an image corresponding to the first incident light; and the j-th lens group to a n-th lens group of the n lens groups perform the imaging based on the j-th incident light, to obtain an image corresponding to the j-th incident light.

* * * * *